US009850711B2

(12) United States Patent
Stone et al.

(10) Patent No.: US 9,850,711 B2
(45) Date of Patent: Dec. 26, 2017

(54) AUTONOMOUS LASER-POWERED VEHICLE

(71) Applicant: Piedra-Sombra Corporation, Inc., Del Valle, TX (US)

(72) Inventors: William C. Stone, Del Valle, TX (US); Bartholomew P. Hogan, Rockville, MD (US)

(73) Assignee: Stone Aerospace, Inc., Del Valle, TX (US)

(*) Notice: Subject to any disclaimer, the term of this patent is extended or adjusted under 35 U.S.C. 154(b) by 831 days.

(21) Appl. No.: 14/335,863

(22) Filed: Jul. 18, 2014

(65) Prior Publication Data

US 2017/0211328 A1    Jul. 27, 2017

Related U.S. Application Data

(60) Provisional application No. 61/879,356, filed on Sep. 18, 2013.

(51) Int. Cl.
*G02B 6/00* (2006.01)
*E21B 7/00* (2006.01)
(Continued)

(52) U.S. Cl.
CPC .............. *E21B 7/008* (2013.01); *E21B 7/15* (2013.01); *G02B 7/008* (2013.01); *G02B 19/0028* (2013.01); *G02B 19/0047* (2013.01)

(58) Field of Classification Search
CPC  E21B 7/008; E21B 7/15; G02B 7/008; G02B 19/0028; G02B 19/0047; H01S 3/06704
(Continued)

(56) References Cited

U.S. PATENT DOCUMENTS 3,688,992 A    9/1972  Schallis
3,813,511 A    5/1974  Staal
(Continued)

FOREIGN PATENT DOCUMENTS

JP    363113256 A    5/1988
JP    2002193555 A    7/2002
(Continued)

OTHER PUBLICATIONS

Andrew D. Bowen, Dana R. Yoerget, Louis L. Whitcomb, and Daniel J. Fornari, "Exploring the Deepest Depths: Preliminary Design of a Novel Light-Tethered Hybrid ROB for Global Science in Extreme Environments," Marine Technology Society Journal, vol. 38, No. 2, Summer 2004, US.
(Continued)

*Primary Examiner* — Jerry Blevins
(74) *Attorney, Agent, or Firm* — Gunn, Lee & Cave, P.C.

(57) ABSTRACT

An autonomous laser-powered vehicle designed to autonomously penetrate through ice caps of substantial (e.g., kilometers) thickness by melting a path ahead of the vehicle as it descends. A high powered laser beam is transmitted to the vehicle via an onboard bare fiber spooler. After the beam enters through the dispersion optics, the beam expands into a cavity. A radiation shield limits backscatter radiation from heating the optics. The expanded beam enters the heat exchanger and is reflected by a dispersion mirror. Forward-facing beveled circular grooves absorb the reflected radiant energy preventing the energy from being reflected back towards the optics. Microchannels along the inner circumference of the beam dump heat exchanger maximize heat transfer. Sufficient amount of fiber is wound on the fiber spooler to permit not only a descent but also to permit a sample return mission by inverting the vehicle and melting its way back to the surface.

8 Claims, 15 Drawing Sheets

(51) Int. Cl.
  *G02B 19/00* (2006.01)
  *G02B 7/00* (2006.01)
  *E21B 7/15* (2006.01)

(58) Field of Classification Search
  USPC .......................................................... 385/134
  See application file for complete search history.

(56) References Cited

U.S. PATENT DOCUMENTS

| | | | |
|---|---|---|---|
| 3,825,211 A | 7/1974 | Minovitch | |
| 4,354,645 A | 10/1982 | Glavas et al. | |
| 4,580,399 A | 4/1986 | Henrich | |
| 4,767,271 A | 8/1988 | Catlow | |
| 4,961,545 A | 10/1990 | LeCompte | |
| 5,022,603 A | 6/1991 | Maree et al. | |
| 5,039,193 A | 8/1991 | Snow | |
| 5,044,573 A | 9/1991 | Le Compte | |
| 5,058,969 A | 10/1991 | Peterson et al. | |
| 5,074,489 A | 12/1991 | Gamzon | |
| 5,099,144 A | 3/1992 | Sai | |
| 5,152,135 A | 10/1992 | Kare | |
| 5,161,208 A | 11/1992 | Christie et al. | |
| 5,248,931 A | 9/1993 | Flesner et al. | |
| 5,260,639 A | 11/1993 | De Young et al. | |
| 5,402,966 A | 4/1995 | von Hoessle | |
| 5,436,553 A | 7/1995 | Pepper et al. | |
| 5,503,350 A | 4/1996 | Foote | |
| 5,685,505 A | 11/1997 | Meckler | |
| 5,686,694 A | 11/1997 | Hillenbrand et al. | |
| 5,748,102 A | 5/1998 | Barron | |
| 6,167,831 B1 | 1/2001 | Watt et al. | |
| 6,223,675 B1 | 5/2001 | Watt et al. | |
| 6,257,162 B1 | 7/2001 | Watt et al. | |
| 6,390,012 B1 | 5/2002 | Watt et al. | |
| 6,407,535 B1 | 6/2002 | Friedman | |
| 6,411,565 B1 | 6/2002 | Sirmalis et al. | |
| 6,488,223 B1 | 12/2002 | Myrabo | |
| 6,534,705 B2 | 3/2003 | Berrios et al. | |
| 6,669,126 B1 | 12/2003 | Albert et al. | |
| 6,910,658 B1 | 6/2005 | Hart et al. | |
| 6,964,509 B2 | 11/2005 | Gozum et al. | |
| 6,968,112 B2 | 11/2005 | Zamel et al. | |
| 7,263,245 B2 | 8/2007 | Delcher et al. | |
| 7,356,209 B2 | 4/2008 | Delcher et al. | |
| 7,540,255 B2 | 6/2009 | Hawkes | |
| 7,599,583 B2 | 10/2009 | Levinson | |
| 7,786,419 B2 | 8/2010 | Hyde et al. | |
| 7,854,267 B2 | 12/2010 | Smith et al. | |
| 7,859,071 B2 | 12/2010 | Levinson | |
| 8,335,409 B2 | 12/2012 | Popp | |
| 8,369,673 B2 | 2/2013 | Hawkes et al. | |
| 8,556,538 B2 | 10/2013 | Hawkes et al. | |
| 8,616,805 B2 | 12/2013 | Hawkes et al. | |
| 8,662,160 B2 | 3/2014 | DeWitt | |
| 9,080,425 B2 | 7/2015 | Zediker | |
| 9,328,559 B2 * | 5/2016 | Schwarz | E21B 4/06 |
| 2002/0046763 A1 | 4/2002 | Berrios | |
| 2005/0126624 A1 | 6/2005 | Pellizzari | |
| 2006/0289724 A1 | 12/2006 | Skinner | |
| 2007/0056262 A1 | 3/2007 | Leach | |
| 2008/0056642 A1 * | 3/2008 | Byer | G02B 6/00 385/27 |
| 2008/0197238 A1 | 8/2008 | Bae | |
| 2008/0235418 A1 | 9/2008 | Werthen et al. | |
| 2009/0086309 A1 | 4/2009 | Moosburger | |
| 2009/0206697 A1 | 8/2009 | Marshall et al. | |
| 2009/0296746 A1 | 12/2009 | Heaton et al. | |
| 2010/0025003 A1 | 2/2010 | Smith et al. | |
| 2010/0044106 A1 | 2/2010 | Zediker et al. | |
| 2010/0078995 A1 | 4/2010 | Hyde et al. | |
| 2010/0079000 A1 | 4/2010 | Hyde et al. | |
| 2010/0079008 A1 | 4/2010 | Hyde et al. | |
| 2010/0079009 A1 | 4/2010 | Hyde et al. | |
| 2010/0079010 A1 | 4/2010 | Hyde et al. | |
| 2010/0079011 A1 | 4/2010 | Hyde et al. | |
| 2010/0079012 A1 | 4/2010 | Hyde et al. | |
| 2010/0215326 A1 * | 8/2010 | Zediker | E21B 7/14 385/100 |
| 2010/0275576 A1 | 11/2010 | Gutman | |
| 2010/0296777 A1 | 11/2010 | Popp | |
| 2012/0068086 A1 | 3/2012 | DeWitt | |
| 2012/0212436 A1 | 8/2012 | Kobayashi et al. | |
| 2012/0266803 A1 | 10/2012 | Zediker | |
| 2012/0298850 A1 | 11/2012 | Ford | |
| 2014/0345276 A1 | 11/2014 | Kosamana | |

FOREIGN PATENT DOCUMENTS

| | | |
|---|---|---|
| WO | 2010096086 | 8/2010 |
| WO | 2010144160 | 12/2010 |
| WO | WO 2012131021 A2 | 10/2012 |

OTHER PUBLICATIONS

Kevin Dowling, "Power Sources for Small Robots," Carnegie Mellon University, pp. 1 through 37, CMU-RI-TR-97-02, Copyright 1997, US.

* cited by examiner

AUTONOMOUS LASER-POWERED VEHICLE

CROSS REFERENCE TO RELATED APPLICATIONS

This original non-provisional application claims priority to and the benefit of U.S. provisional application Ser. No. 61/879,356, filed Sep. 18, 2013, and entitled "Autonomous Laser-Powered Vehicle," which is incorporated by reference herein.

U.S. application Ser. No. 14/292,495, filed May 30, 2014, and entitled "Power Conversion Module for Use with Optical Energy Transfer and Conversion System," is incorporated by reference herein.

U.S. application Ser. No. 13/303,449, filed Nov. 23, 2011 and entitled "Optical Energy Transfer and Conversion System," is incorporated by reference herein.

STATEMENT REGARDING FEDERALLY SPONSORED RESEARCH OR DEVELOPMENT

This invention was made with Government support under Grant No. NNX11AJ89G awarded by NASA. The Government has certain rights in this invention.

BACKGROUND OF THE INVENTION

1. Field of the Invention

The present invention relates to autonomous laser-powered vehicles. More specifically, the present invention relates to a field-deployable autonomous cryobot for penetrating through ice caps of substantial (e.g., kilometers) thickness to deploy astrobiology science payloads and to enable recovery of the vehicle and its in-situ acquired samples at the conclusion of a mission.

2. Description of the Related Art

U.S. application Ser. No. 13/303,449 (the '449 Application) describes the development of an integrated collection of systems that enable the transmission and effective end-use of very large amounts of optical power (kilowatts to tens of megawatts) over relatively long distances (from a kilometer to as much as one-hundred kilometers or more) to fixed, movable, or mobile platforms operating on the ground, undersea, under ice, in the air, in space, and on other planets. The concept is inherently non-line-of-sight, which allows it to directly bypass severe problems that have plagued efforts to utilize laser power beaming over large distances through the atmosphere, underwater, and over terrain where the receiver is not within view of the optical power source.

The '449 Application previously disclosed, inter alia, a ground-based (or base-of-operations-based) power supply with a chilling system used to provide sufficient electrical power and appropriate coolant to a high power fiber laser directing power into an optical fiber. For the purposes of this discussion "laser power" and "optical power" are used interchangeably to refer to any wavelength of electromagnetic radiation that can be effectively injected into a small diameter fiber (generally less than one millimeter in diameter, but potentially larger) that is fabricated from a material that is optically transparent at the selected wavelength.

One aspect of the '449 Application is power re-conversion to electricity and mechanical power at the far end of the fiber. In several cases described in the '449 Application, a "beam dump" is used where the optical energy carried by the fiber is expanded into a diffuse, divergent or collimated broad beam, and caused to impinge directly or indirectly on a thermal mass capable of withstanding the intense heat that will be produced. The beam dump can be advantageously fabricated from a high temperature refractory material.

It was previously believed that beryllium oxide (BeO) or copper could be used to the beam dump material. However, with regard to beryllium oxide (BeO), toxicity issues and the complexity of the necessary piping precluded this option in the end on the grounds of fabrication problems. Concerning copper as material for the beam dump, it was not available in large billet sizes and similarly could not be cast with the very complex internal channels that are required. The beam dump of the present invention was made using a machined block of T6061 T6 aircraft alloy aluminum and a heat-resistant, photon-absorbing, non-off-gassing coating.

"Heat exchanger," as used herein, refers to any method of capturing, extracting and transferring of heat from one location (e.g., the core of the beam dump) to a different location (e.g., a Stirling engine adjacent to the beam dump) such that maximum electrical energy can be derived from the photonic energy delivered to the beam dump.

BRIEF SUMMARY OF THE INVENTION

The present invention is an autonomous laser-powered vehicle ("cryobot") designed to autonomously penetrate extremely deep glacial ice caps, both on Earth and in space (e.g., ice caps of Mars or the surface ice cap of the Jovian moon Europa) by melting a path ahead of the vehicle as it descends. Sufficient amount of fiber (through which power would be transmitted to the cryobot) is wound on a spool carried on the cryobot to permit not only a descent through the deepest known ice caps on Earth (e.g., approximately four thousand meters) but also to permit a sample return mission by inverting the cryobot and melting its way back to the surface.

The autonomous laser-powered vehicle has a cylindrical configuration and comprises a vehicle exterior structure made up of a plurality of rods and a plurality of modular exterior shell panels. The plurality of rods serves as a skeleton or structural anchor for the plurality of panels. The panels can be removed for access to any portion of the vehicle. When the vehicle is fully assembled, the plurality of panels provides a smooth exterior surface of the vehicle. The remainder of the components includes beam optics, a beam expansion cavity, a beam dump heat exchanger, an antenna, a pump assembly, an onboard computer stack, an end plate, and an onboard bare fiber spooler. In an alternative embodiment, the present invention described herein may use an armored process fiber through which laser power is provided, rather than an onboard bare fiber spooler, to connect the melt head optics to the beam dump.

DETAILED DESCRIPTION OF THE INVENTION

Figure 1:
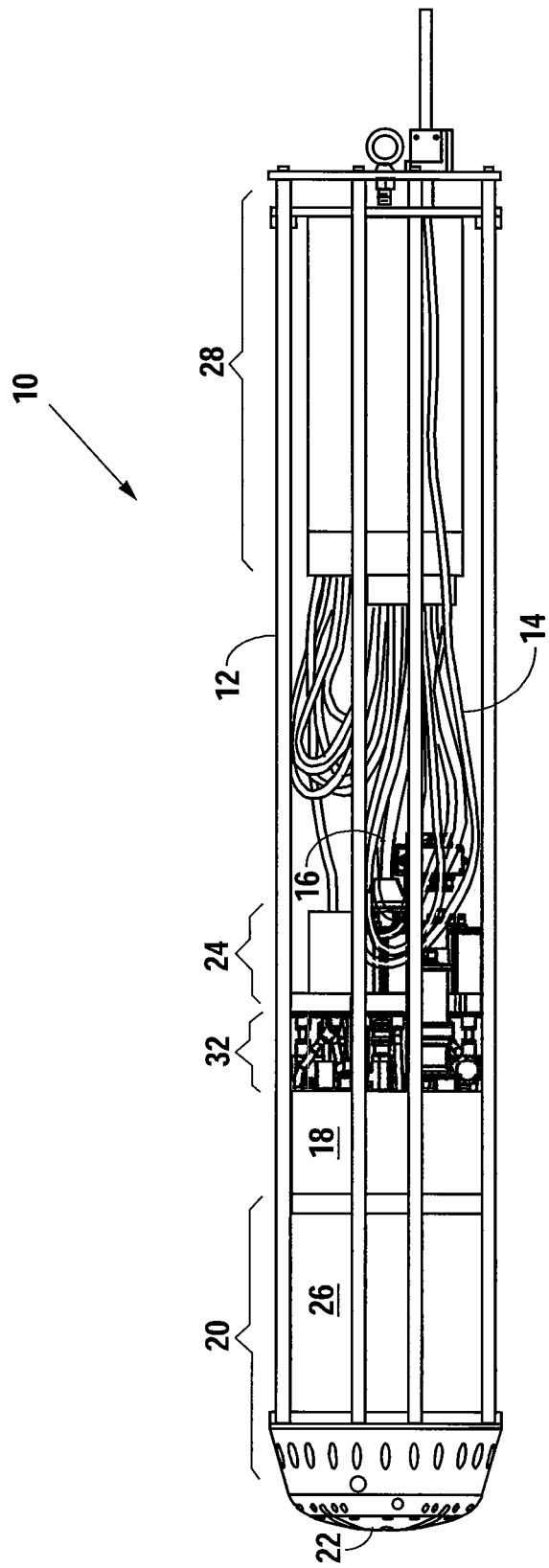
FIG. 1 is a side view of an embodiment of the present invention.

FIG. 1 depicts the present invention, or vehicle 10, with the modular exterior shell panels removed. The vehicle exterior structure is comprised of a plurality of rods 12 and a plurality of modular exterior shell panels (not shown). The plurality of rods 12 serves as a skeleton or structural anchor for the plurality of panels. The panels can be removed for access to any portion of the vehicle 10. When the vehicle 10 is fully assembled, the plurality of panels provides a smooth exterior surface of the vehicle 10. A prototype vehicle 10 designed to function with a 5 kilowatt laser measures 25.4 cm in diameter×1.25 m in length. There is no "optimum" size for this vehicle. The 25.4 cm diameter provides a reasonable rate of descent through ice with the size of laser used. It is highly likely that a vehicle with a larger diameter in conjunction with much larger lasers can be used for a Europa full-mission simulation mission in Antarctica. For example, up to a 200 kilowatt laser may be used for this purpose and this number can be expected to grow every year. Therefore, it is contemplated that large variances of these dimensions can be made and still be within the scope of the invention.

FIG. 1 further shows, generally, the remainder of the components for vehicle 10 which are contained within this precious real estate. These other components include beam dispersion optics 32, a beam expansion cavity 18, a beam dump heat exchanger 20, an antenna 26, a pump assembly 24, an onboard computer stack 28, an end plate 22, and a laser armored process fiber 30 (See FIG. 2). A discussion of these components follows.

The vehicle is designed to perform multi-kilometer-thick ice cap penetration. To do so, the vehicle 10 must have the capability of melting ice externally. Still referring to FIG. 1, the end plate 22, together with the dispersion optics 32, a beam expansion cavity 18 and a beam dump heat exchanger 20 make up the critical melt head of the vehicle 10. The critical melt head—the "business" end of the vehicle 10—is where laser power is converted to heat to melt through the ice. The critical melt head is also where the laser power is converted to electricity to power the vehicle and its fluid pumps and hot water jets.

Perhaps the single most sensitive design element for vehicle 10 is the point where the process fiber 30 that carries coherent light from the laser (not shown) has to enter the beam dump heat exchanger 20. This is the beam dump optics. For robustness, the present invention focuses around modularity so that failed components are replaced easily in the field. This means having a "quick connect" style high-power laser coupling at the beam dump rear bulkhead 110 (see e.g., FIG. 9). QBH class connectors that fuse the core of an armored fiber to a solid quartz optical window are used. The process fiber 30 from a photon or laser source (not shown) is connected to beam dispersion optics 32 via QBH high-power fiber connector 16. In an alternative embodiment, a bare fiber spooler is inserted onboard the vehicle 10 and fusion splices are created to QBH "pigtails" that are used for field connections. Alternatively, the bare fiber spooler fiber is fusion bonded directly to a custom quartz block to create the same effect and allow for a quick connection to the beam dump optics.

Figure 2:
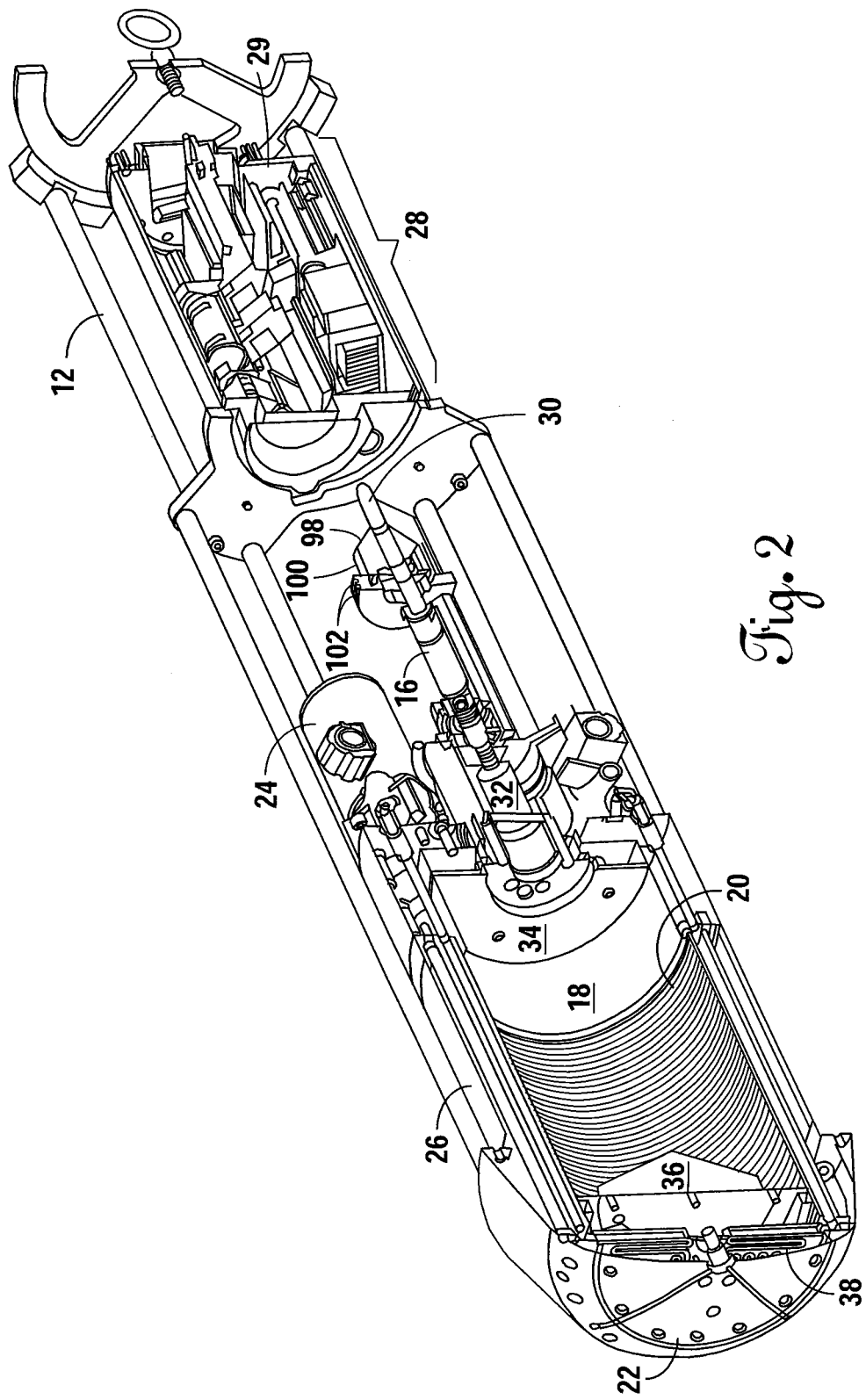
FIG. 2 is a side perspective partial sectional view of an embodiment of the present invention.

Referring now to FIG. 2, the beam dump heat exchanger 20 is arguably the most complicated single component in the vehicle 10. The beam dump heat exchanger 20 must perform several complex tasks which all must be done in a very compact volume. These tasks include: to efficiently collect heat from the laser beam; to transfer that heat to the water being sent to the ice melting jets at the nose of the vehicle; to handle switching piping lines that allow for the vehicle to select which jets will be in use at any given moment (for direct descent or for turning either to investigate a location off a direct descent path or to avoid obstacles detected in front of the vehicle's path); to pass electrical sensing lines between the nose of the vehicle and the onboard computer; and to serve as the interface barrel for a synthetic aperture radar (SAR) antenna 26. The vehicle 10 has a SAR antenna for obstacle avoidance. The SAR antenna "looks" ahead and detects obstacles in 3D space. The onboard computer then determines which way the vehicle has to deviate from a true vertical descent and then it activates turning hot water jets to cause the vehicle to move in the direction needed to avoid hitting an object embedded in the ice, e.g., rocks and glacial debris.

In the present invention, the optics delivery system (i.e., Process fiber; and later bare fiber) enters the beam dump through a cylindrical optical stack. This cylindrical optical stack configuration allows for both bare fiber and for standard industry QBH style laser connectors to be attached.

After the photon flux (power) enters through the beam dispersion optics 32, the laser beam expands into the beam expansion cavity 18. A radiation shield 34 limits backscatter radiation from heating the beam dispersion optics assembly 32. The expanded laser beam then enters the beam dump heat exchanger 20 where it is reflected by a beam dump dispersion mirror 36. The beam dump dispersion mirror 36 is a way to further control the beam expansion from the laser beyond that which was capable by a lens system only.

Figure 3:
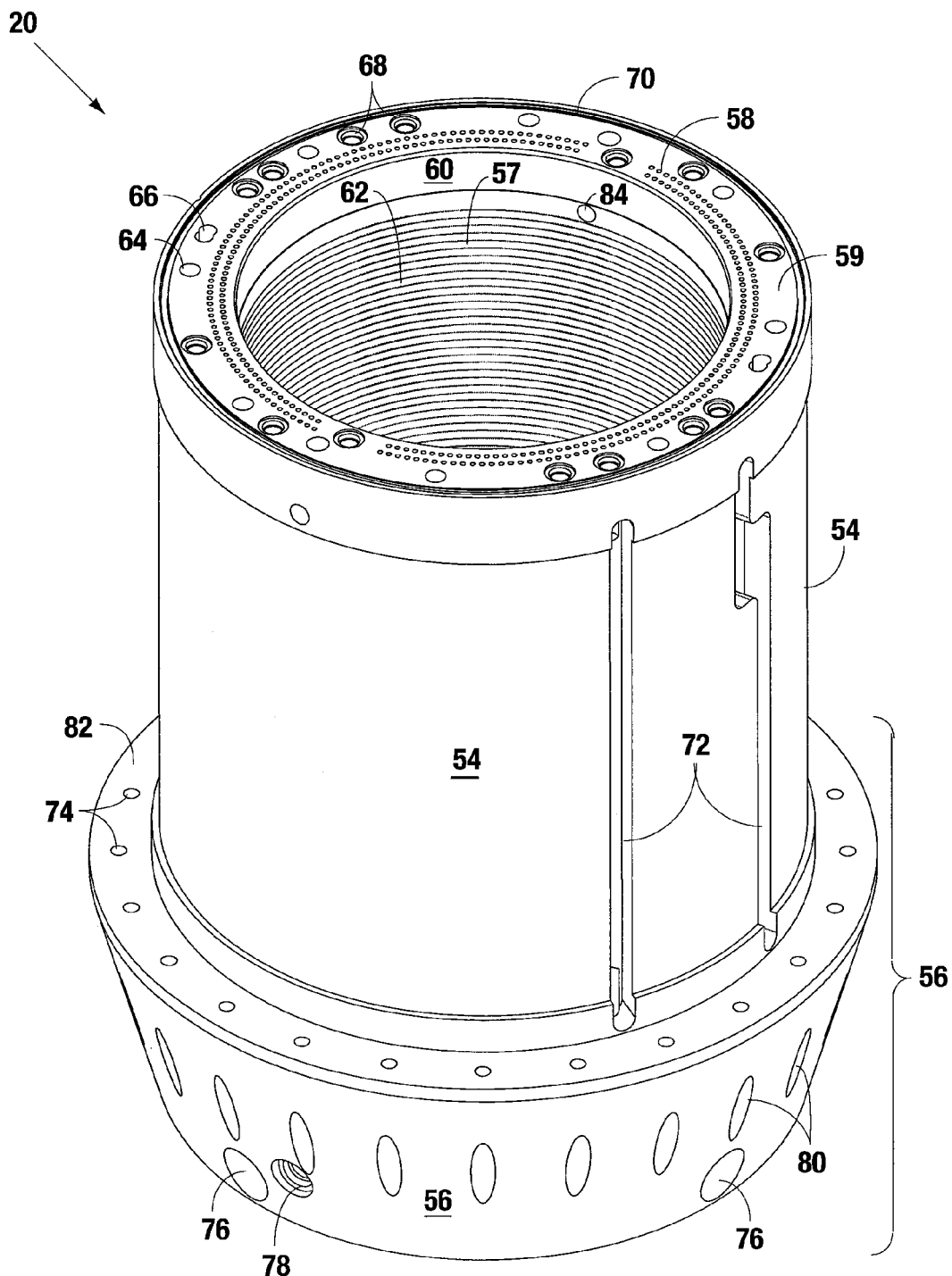
FIG. 3 shows a side perspective view of the beam dump heat exchanger of the present invention.
Figure 7:
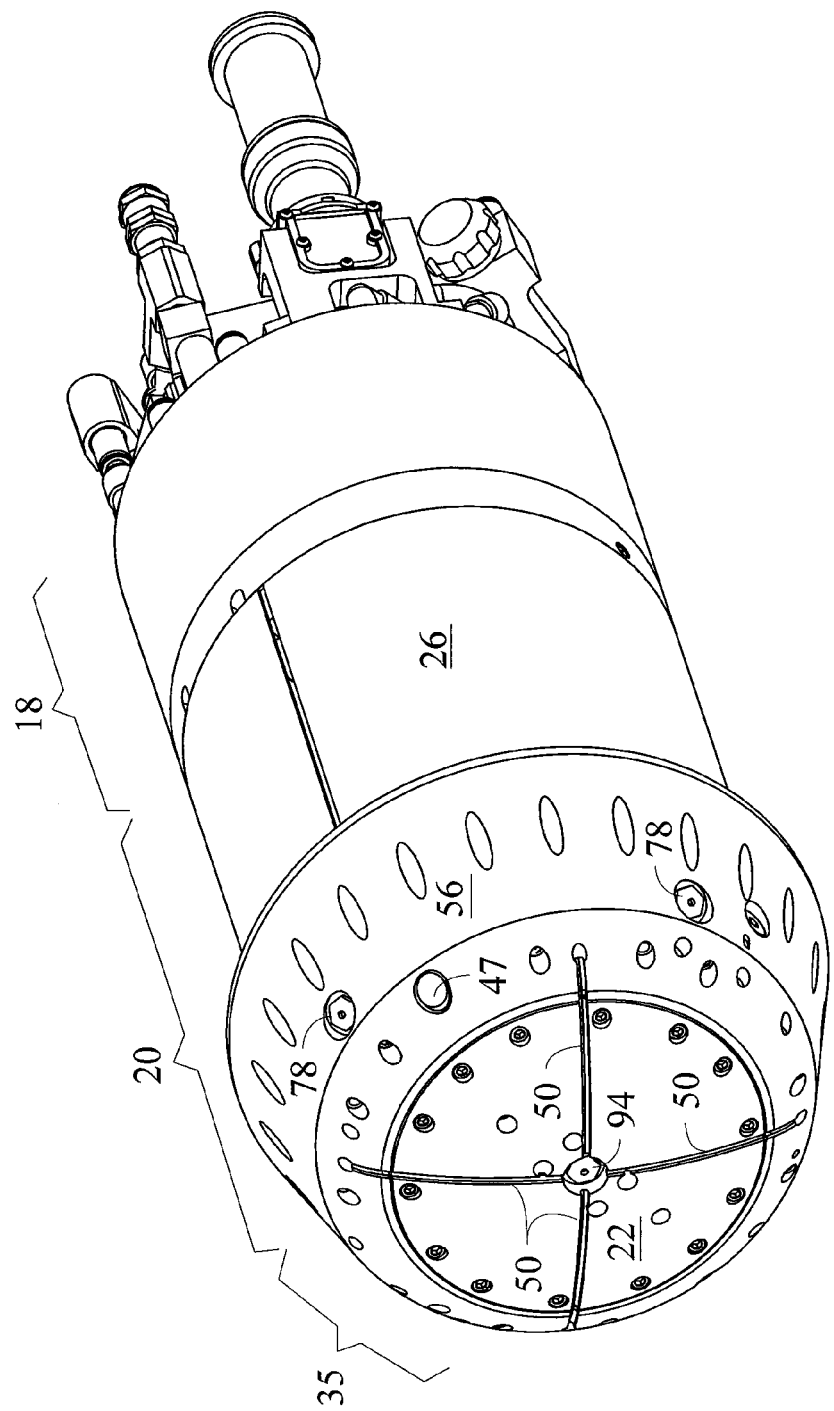
FIG. 7 is a side perspective view of the present invention with the nose cone cap plate attached to end of the present invention.

As shown in FIG. 3, the beam dump heat exchanger 20 is comprised of a cylindrical pressure vessel wall 54 and a cone portion 56 (see also FIG. 7). The cone portion 56 extends radially outward and beyond cylindrical pressure vessel wall 54 forming edge 82. A plurality of screw holes 74 are contained within edge 82 of cone portion 56 for fastening cone portion 56 to the structural exoskeleton rods 12 in the present instances of the device. In the final version of the device, the fasteners serve as a structural connection point for the SAR radar antenna panels (not shown) which mate over SAR Antenna interface 26 and ultimately replace the structural rods 12 shown. A plurality of indentations 80 are evenly spaced and circumscribe cone portion 56. The plurality of indentations 80 serve as insertion points for fasteners so as to provide a structural joint between the beam dump and the rest of the vehicle. Several lateral melt jets 76 are contained within the cone portion 56. In the preferred embodiment, there are four (4) lateral melt jets at 90° spacing around the nose cone, or end plate 22. The lateral melt jets use hot water to melt the ice and are used for turning the vehicle 10 during a mission. Screws (not shown) traverse screw holes 78 to attach the cone portion 56 of beam dump heat exchanger 20 to mirror assembly 35. Although screws are used for fastening or attaching various components together, other fastening devices such as bolts, pins, or the like may be used without going beyond the scope of the present invention.

Still referring to FIG. 3, on the other side of beam dump heat exchanger 20 (opposite cone portion 56), in the interior cavity 57 of beam dump heat exchanger 20 are scores of forward-facing beveled circular grooves 62 along sidewall 60. The forward-facing beveled circular grooves 62 served to absorb radiant energy (reflected from mirror 36) and prevent the energy from being reflected back towards the beam dispersion optics 32 (as shown in FIG. 2). The direction of the PV arrays (not shown) within cavity 57 of beam dump heat exchanger 20 may be arranged in a direction facing toward beam dump dispersion mirror 36 (this is the opposite direction as disclosed in the '449 Application that described the PV arrays as facing toward the laser beam as the laser beam enters the beam dump heat exchanger). In this alternative arrangement, the primary light for the PV arrays is that which is reflected from the IR mirror. Both approaches can be utilized. For example, having an annular ring of PV chips around the periphery of the IR cone mirror and also adding PV annular rings facing towards the IR mirror for further electrical power generation. A non-off-gassing "optical black" ceramic coating is anodized onto the metal of the beam dump heat exchanger 20. A tuned wavelength heat-tolerant photovoltaic array would see incident laser flux on the order of 10 W/cm$^2$, but higher flux may be feasible as high temperature PV chip technology improves Still referring to FIG. 3, heat transfer is maximized through the use of a plurality of microchannel heat exchangers 58 (hundreds of them) along the inner circumference of back end 59 surrounding cavity 57. The plurality of microchannel heat exchangers 58 are channels machined using a method known as electrical discharge machining—sometimes called "Wire EDM"—in which long straight wire electrodes, rather than drills, are used to bore the holes.

Wire EDM milled microchannels have the highest heat flow rate. The channels are machined through the axial length (30 cm long) of the cylindrical pressure vessel wall 54 and transfer returning meltwater through the hot sidewalls. Final microchannel count is 328×1.6 mm diameter vertically machine holes. Diaphragm pumps (discussed later) then pump that heated water through much larger channels 68. Large diameter hot water flow channels 68 show recessed machine cuts to accommodate the placement of an oring therein. Large hot water channels 68 further function as both intake (to bring in cold melt water) and output (to drive the hot water jets at the front of the vehicle 10) to reach the nose mounted melting and turning jet nozzles 94 and 76 (see FIGS. 3, 6, 7). There are 14 liquid large diameter flow channels 68 that handle the 5 water jets and the intake vents. Structural mount holes 64 or electrical wire pass-throughs 66 are contained within the outer circumference of the back end 59 of beam dump heat exchanger 20. O-ring 70 sits within a groove at the outer edge of the outer circumference for sealing against leakage once back end 59 of beam dump heat exchanger 20 is connected to beam expansion cavity 18. Grooves 72 contained within cylindrical pressure vessel wall 54 provide an area for securing SAR antenna 26 to beam dump heat exchanger 20.

Figure 4:
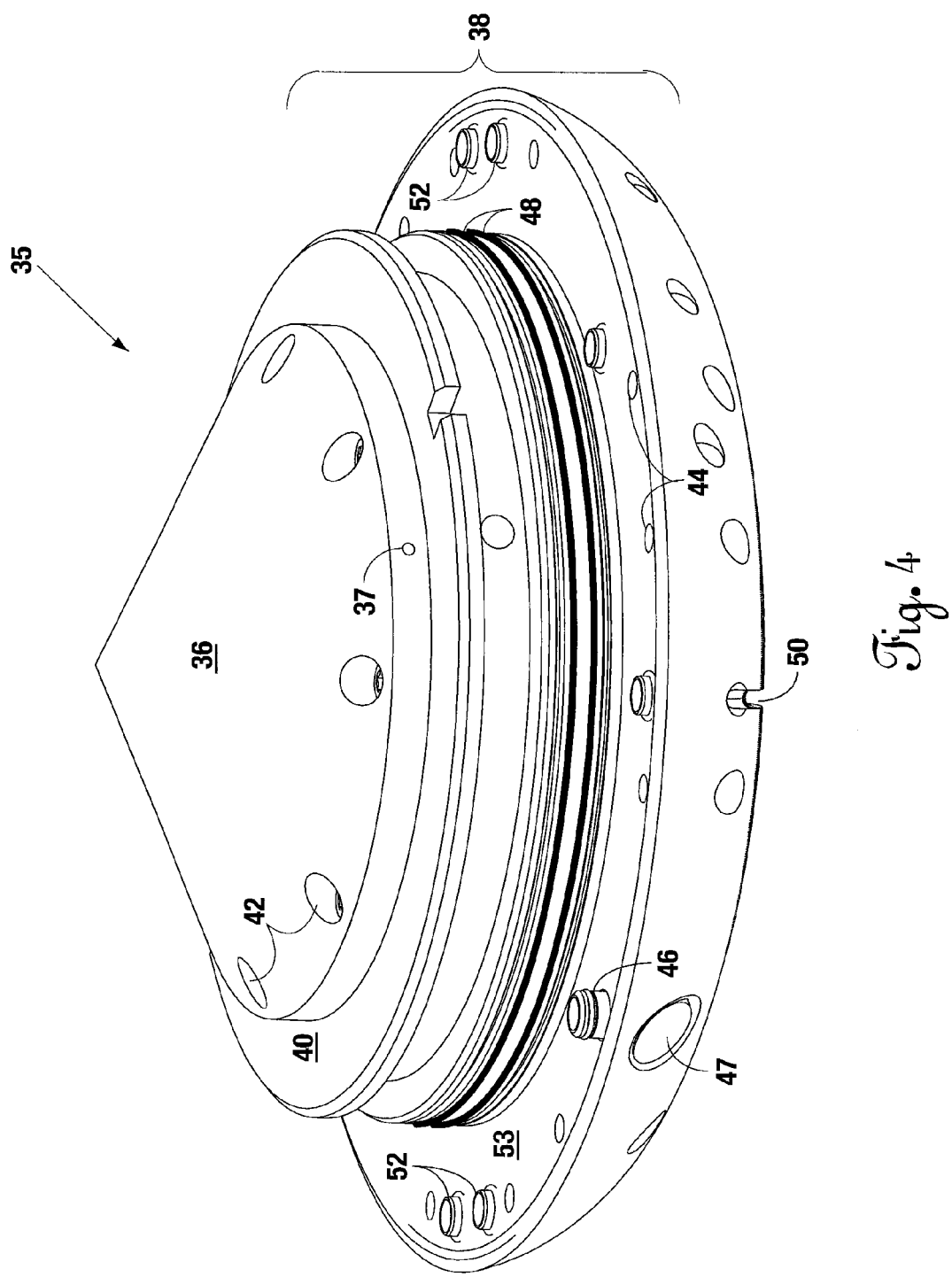
FIG. 4 depicts a side perspective view of the beam dump dispersion mirror of the present invention.

FIG. 4 depicts mirror assembly 35. Mirror assembly 35 is comprised of beam dump dispersion mirror 36 and nose heat exchanger 38. The forward end of beam dump heat exchanger 20 radiates heat into sidewalls 60 through the use of beam dump dispersion mirror 36. Beam dump dispersion mirror 36 has a conical configuration and is a precision diamond turned gold-plated beam dispersion infrared (IR) mirror that reflects the beam the divergent beam back onto sidewall 60 of beam dump heat exchanger 20. Though the shape of beam dump dispersion mirror 36 is conical, beam dump dispersion mirror 36 may exist in other configurations as well to obtain the desired beam dispersion pattern inside the chamber, or cavity 57 of beam dump heat exchanger 20. In other words, mirror 36 can be diamond machined to any shape of revolution and that shape can be designed to provide a particular pattern of reflected light intensity so as, for example, to project onto a cylindrical or spherical internal surface so that all PV chips were seeing similar photon flux—watts per square centimeter.

Figure 5:
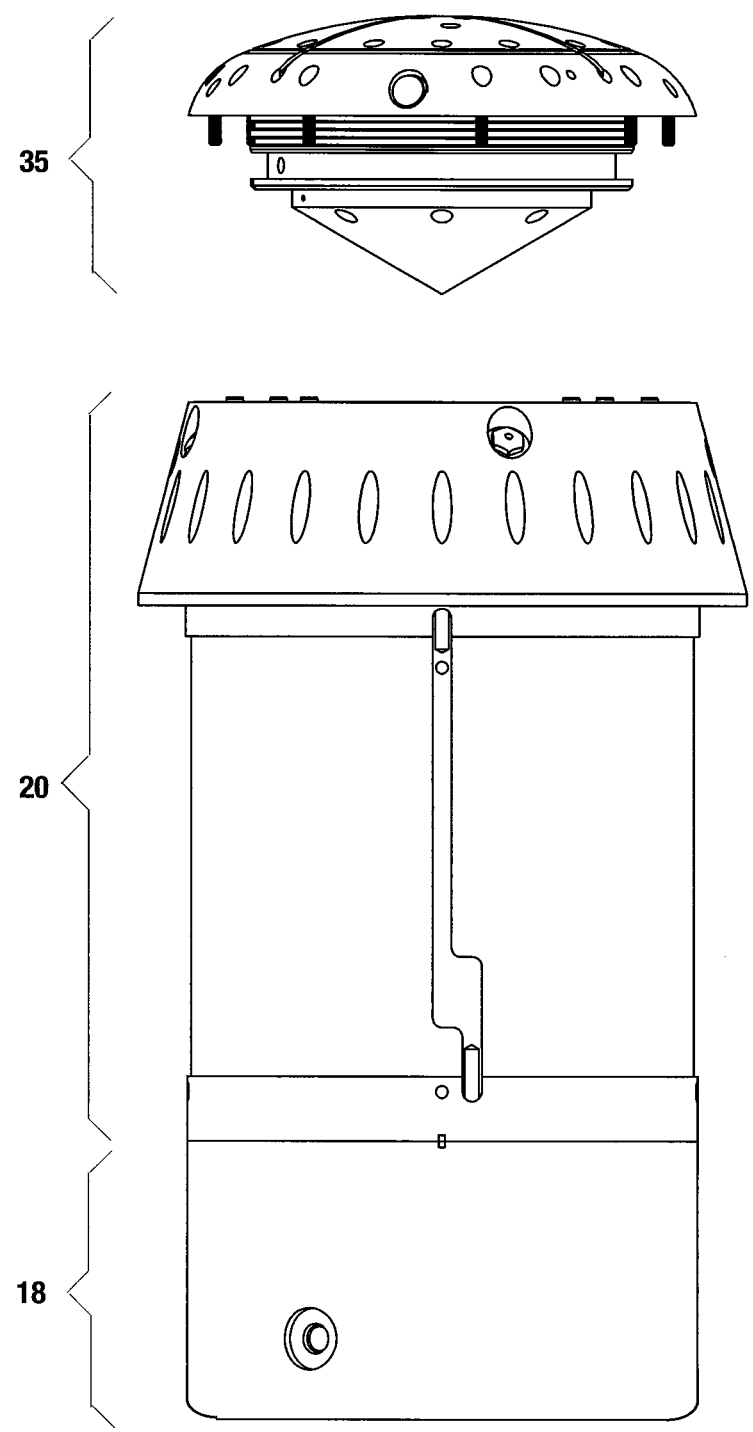
FIG. 5 shows mating of the beam dump dispersion mirror to the beam dump heat exchanger of the present invention.

Beam dump dispersion mirror 36 is seated and connected to the front side 40 of nose heat exchanger 38 through screws (not shown) by a series of screw holes 37 (only one of which is shown) and 42. End 53 of nose heat exchanger 38 contain screw holes 44, tubular O-ring joining seals 46 (only one of which is shown) and large channels 52 which pass water flow to and from the front of the vehicle. Screw holes 44, tubular O-ring joining seals 46 and large channels 52 aligned with their corresponding counterpart apertures located on the front end of cone portion 56 of beam dump heat exchanger 20. A plurality of O-rings 48 sit within a plurality of grooves between beam dump dispersion mirror 36 and nose heat exchanger 38 for sealing against leakage once mirror assembly 35 is mated with beam dump heat exchanger 20 (see FIG. 5). FIG. 5 shows the mating of mirror assembly 35 to beam dump heat exchanger 20 and beam expansion cavity 18.

Figure 6:
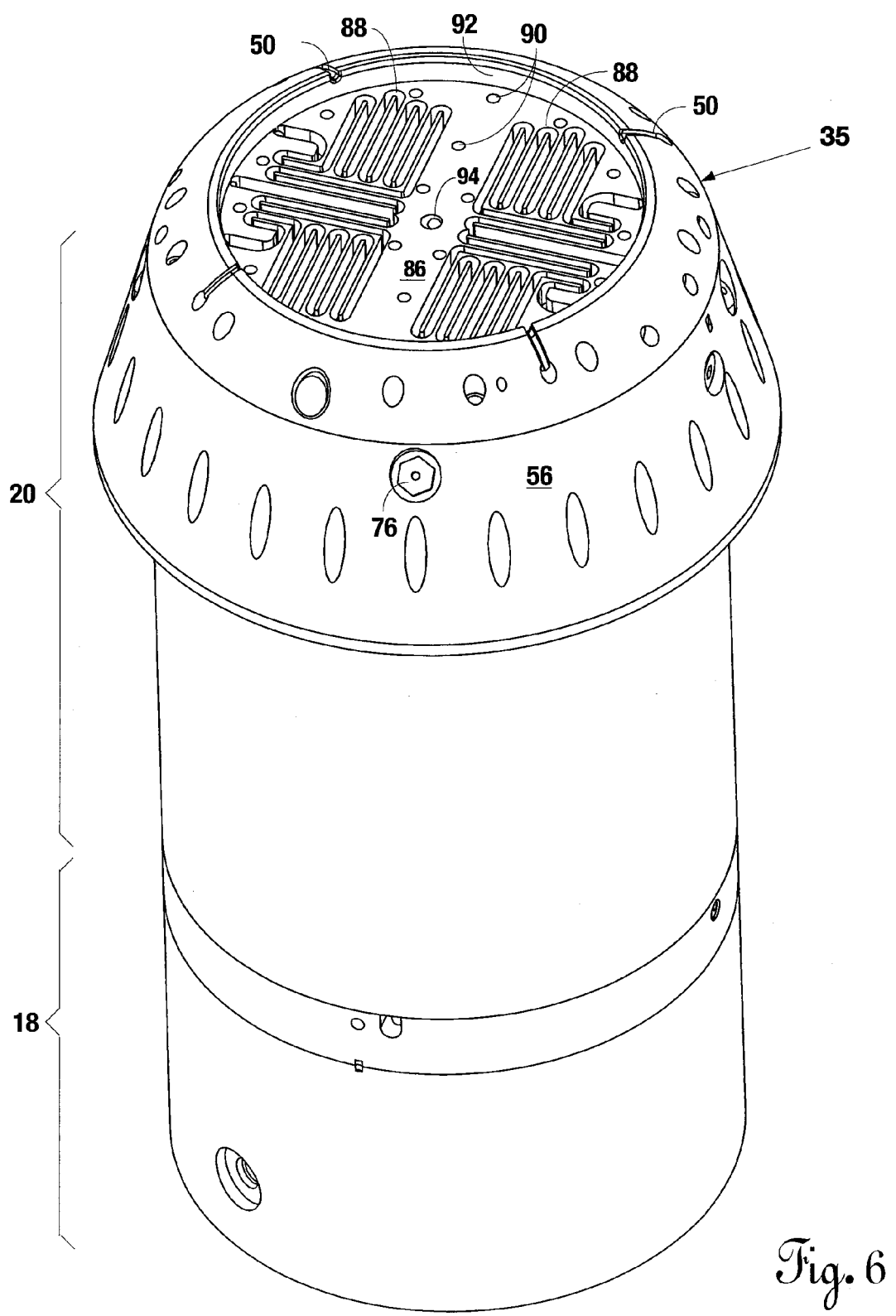
FIG. 6 shows a rear perspective view of the beam dump dispersion mirror backing structure once mated to the beam dump heat exchanger of the present invention.

FIG. 6 shows the backing structure of mirror assembly 35 once mated with the front end of cone portion 56 of beam dump heat exchanger 20. Mirror assembly 35 is in an arcuate configuration reducing in diameter distally from beam dump dispersion mirror 36 until recessed portion 86. Recessed portion 86 is circumscribed by inside wall 92. Forward melt jet 94 is in the epicenter of recessed portion 86. A plurality of planar heat exchanger channels 88 served to cool and reduce the temperature of beam dump dispersion mirror 36 (which is on the other side of recessed portion 86) and photovoltaic (PV) array when meltwater is being pulled back to the jet pumps 24 from the melt face (end plate 22) as the vehicle 10 descends. A plurality of screws (not shown) attach end plate 22 (see FIG. 7) via a plurality of screw holes 90 to the back side of mirror assembly 35. The plurality of screw holes 90 are arranged symmetrically about forward melt jet 94 within recessed portion 86 and adjacent to inside wall 92 arranged at a constant interval within the outer circumference of recessed portion 86.

Referring now to FIG. 7, the melt face, or end plate 22, is attached to the back side of mirror assembly 35 (which is the front portion of the vehicle 10). Once end plate 22 is attached to the back side of mirror assembly 35, this "front end" becomes approximately hemispherical in configuration. However, this particular configuration is not crucial to operation; a tapered front end configuration could be used provided it contained the essential elements, i.e., hot water jet ports, water intake ports, and water sampling port(s). End plate 22 contains forward melt jet 94 in the center. Cruciform-shaped melt water return channels 50 draw water back through the beam dump heat exchanger 20. Alternate water return channels are possible without affecting the functionality of the invention. Behind bare aluminum front caps 47, two of the lateral melt jets 78 are shown, mounted in the cone portion 56 (which is black anodized) of beam dump heat exchanger 20. SAR radar antenna 26 attaches to and covers cylindrical pressure vessel wall 54 of beam dump heat exchanger 20 so as to be radially flush with the edge of cone portion 56.

Still referring to FIG. 7, beam expansion cavity 18 interfaces with a number of fluid control systems including redundant diaphragm pumps 24 (for driving the hot water jets), pre-pump intake filters and over pressure regulators.

Figure 8:
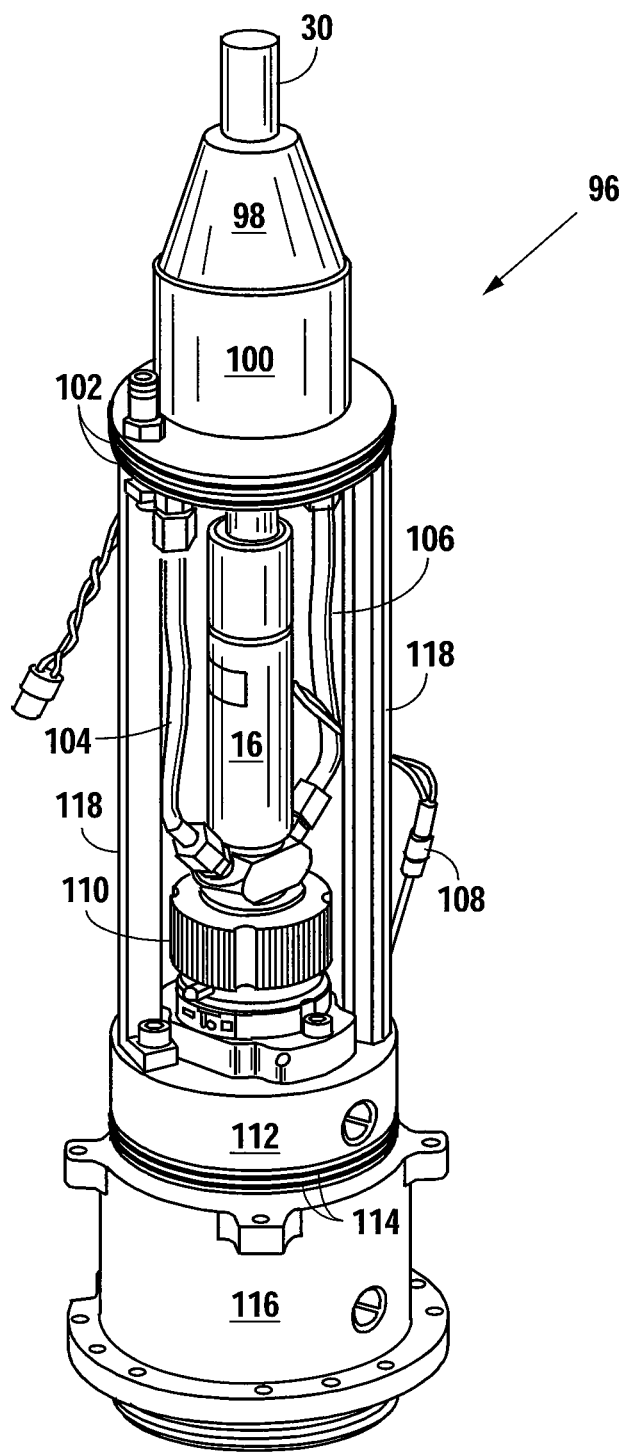
FIG. 8 is a side view of the beam dispersion optics of the present invention.

Perhaps the single most sensitive design element for vehicle 10 is the point where the process fiber 30 that carries coherent light from the laser (not shown) has to enter the beam dump heat exchanger 20. Referring now to FIG. 8, the integrated beam dump optics stack 96 is shown. The integrated beam dump optics stack 96 is a cylindrical tube with precision-turned O-ring sealing surfaces 102 and 114 on each end and a milled cross-shaped connection bracket on the bottom that matches the projection pattern on the optics junction block 112.

Figure 9:
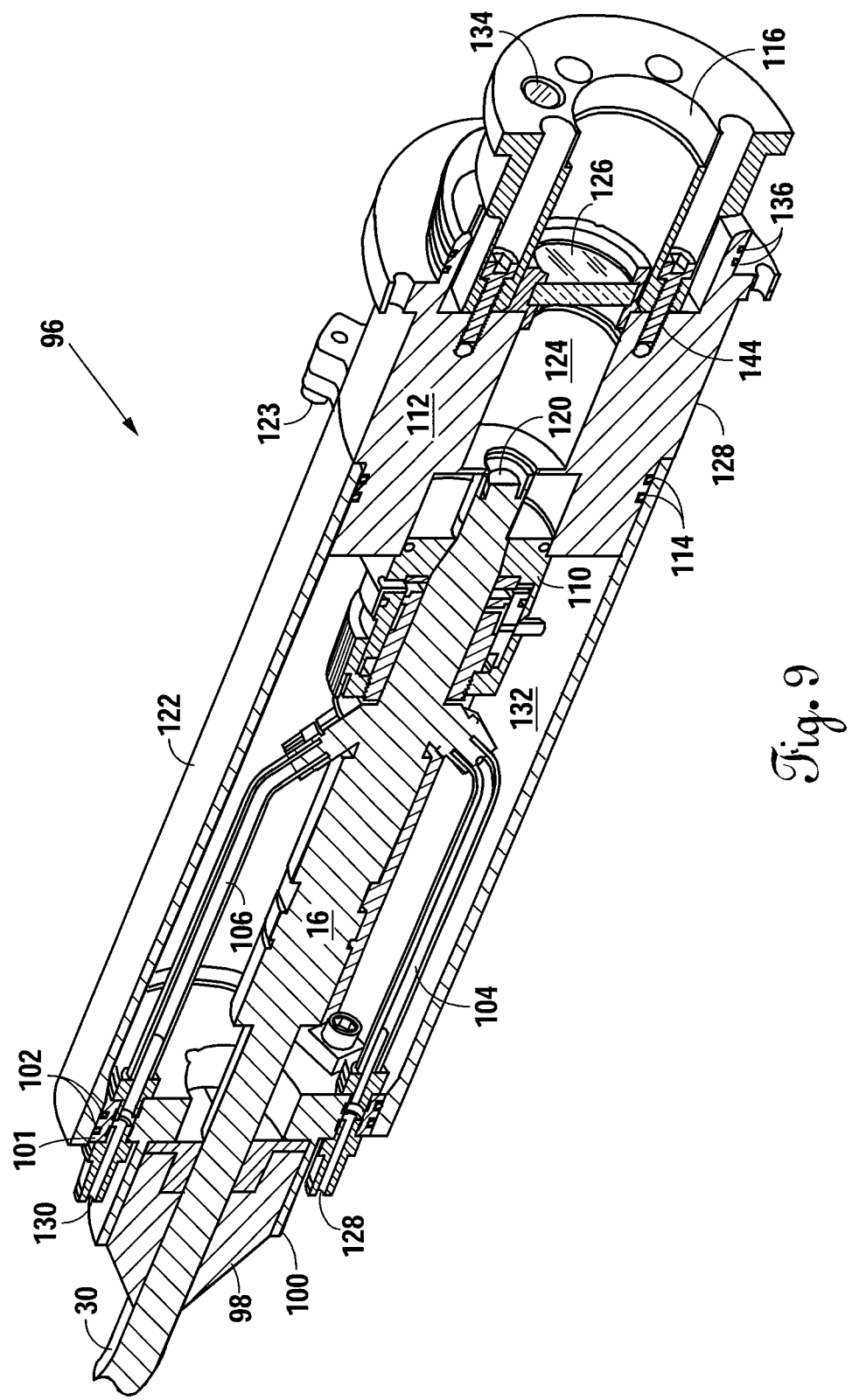
FIG. 9 is a side perspective section view of the pressure proof housing and integrated beam dump optics stack of the present invention.

Referring now to FIGS. 8 and 9, process fiber 30 enters into integrated beam dump optics stack 96 and feeds into QBH high-power fiber connector 16. QBH high-power fiber connector 16 couples to QBH female bulkhead coupler 110 which is mounted on one end of beam dump optics junction block 112. Fused quartz optical window 120 is inboard mounted in beam dump optics junction block 112 such that the beam from process fiber 30 travels down the hollow core 124 of beam dump optics junction block 112 where the beam encounters beam dispersion lens 126. Beam dispersion lens 126 then expands the beam dispersion angle to achieve a cone-like beam (not shown). The cone-like beam then impinges on the end of the beam dump. In an alternative embodiment, a beam dispersion lens array (not shown) may be used.

The back side of QBH high-power fiber connector 16 (where process fiber 30 connects) is not waterproof. Therefore, process fiber 30 is bonded to casting housing 100 by means of cast waterproof joint 98 to prevent the entry of water into integrated beam dump optics stack 96. Cast waterproof joint 98 is 3M Type 4. Because process fiber 30, as described herein, has an inherent length limit of approximately 100 meters, in an alternative embodiment, a similar bonding process (i.e., waterproof junction) may be utilized to allow a bare fiber to enter integrated beam dump optics stack 96.

A plurality of cooling lines from the QBH high-power fiber connector 16 passes through the rear sealing block 101 via machined fittings (inlet port 128 and outlet port 130) which are also waterproof and isolated from the internal volume of the QBH high-power fiber connector 16.

Dual radial O-rings 102 are seated in dual grooves at rear sealing block 101 of QBH casting housing 100. Similarly, beam dump optics junction block 112 also contains dual radial O-rings 114. A cylindrical pressure housing or shell 122 slides down over the two O-ring sealing sets 102 and 114 forming cavity 132 and seals beam dump optics junction block 112 against leakage. The dual O-rings 102, 114 have different diameters to allow the tube to be raised above the upper seal set for attachment of the QBH high-power fiber connector 16. The cavity 132 then created after sealing is purged with dry nitrogen (to remove contaminants). The output of integrated beam dump optics stack 96 is a varying divergence 5 kW 1070 nm conical beam.

However, it is noted that these power levels and particular wavelength can and will vary. Up to a 200 kW (or higher power) laser may be used. Additionally, as the wavelength increases, power attenuation in the bare fiber decreases. Resultantly, wavelengths ranging from 1000 nm to 2000 nm and power levels reaching megawatt and higher levels may be utilized and still come within the contemplation of the present invention.

O-rings are required throughout the vehicle 10 to make it watertight. Special Teflon encapsulated O-rings were considered for use throughout the beam dump and optics assembly to avoid the use of lubricant. The Teflon encapsulated O-rings were used to prevent the de-gassing and creation of hotspot focal points on the optics from the use of O-ring grease, leading to rapid failure of the optics under full power. To prevent condensate, the beam dump cavities were purged with ultra-pure dry nitrogen and, where temperatures were not expected to reach high levels, silica desiccant packs were used to remove any remaining trace humidity.

Despite the above precautions, it was discovered by the onboard humidity sensor that the main beam dump radial O-ring seals were not seating. The Teflon encapsulation imparted too much rigidity to the O-ring and a preset position and shape, established most likely by pressurized nitrogen purging, failed to prevent a small but detectable water leak. Consequently, all O-rings throughout the beam dump and optics assembly and throughout the vehicle were changed to Viton (fluoroelastomer) O-rings. A limited amount of vacuum O-ring grease was also used.

Metal seals may also be used in waterproofing the vehicle. Thus, rendering the vehicle waterproof to the maximum mission depth (e.g., approximately 4 kilometers on Earth; depths may be significantly deeper on other planets) requires utilization of appropriate sealing means, e.g., hybrid combination of orings and metal seals.

Because of the high-power involved, excessive back reflected radiation could easily lead to degradation of beam dispersion lens 126 followed by rapid failure as all power is absorbed at a failure point in either the glass or its anti-reflective coatings. At the power levels being used in the present invention (multi-kilowatt and above), fingerprints or a single grain of dust on refused quartz optical window 120 could lead to burn up of the optics. Consequently, a beam optics diagnostic module is used to monitor temperatures are critical locations.

Figure 10:
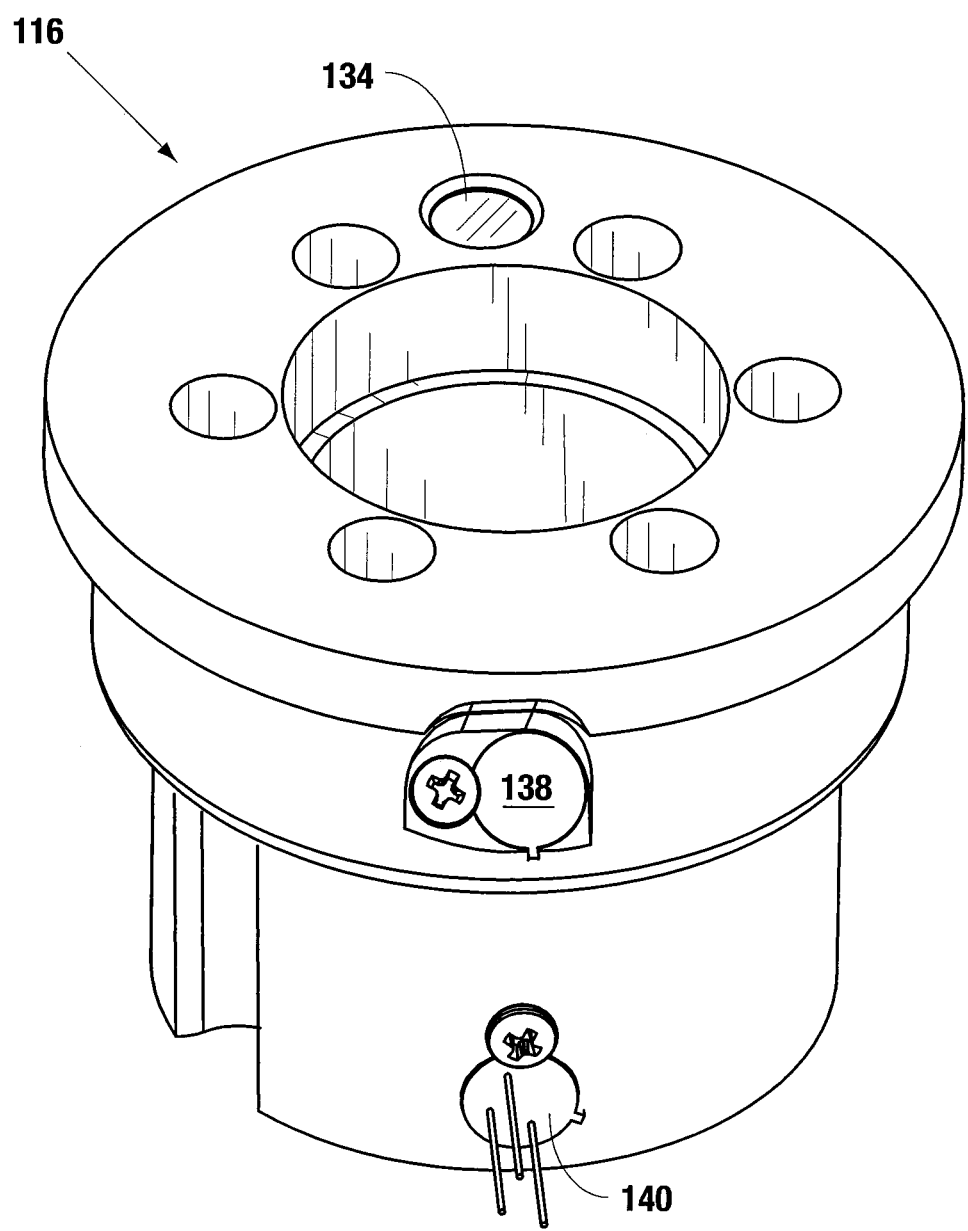
FIG. 10 is a front perspective view of the beam dump IR (infrared) sensing array of the present invention.

Now referring to FIG. 9, beam dispersion optics diagnostic module 116 surrounds beam dispersion lens 126 and is attached to beam dump optics junction block 112 via screws 144. Referring to FIG. 10, assembled beam dispersion optics diagnostic module 116 contains three IR calibrated temperature sensors. The first sensor, QBH exit block temperature IR sensor 138, monitors the temperature at the QBH high-power fiber connector 16. The second sensor, beam divergence lens temperature IR sensor 140, monitors the surface temperature of beam dispersion lens 126. Both of these sensors are narrow beam (12°) MLX90614ESF-DCH sensors from Melexis Technologies. The third sensor (not shown) is a 5×15 pixel IR array which looks down the axis of the beam dump and records both sidewall and end panel mirror temperatures. This third sensor, a MLX 906 to 20ESF-BAB also from Melexis Technologies, is a 16×4 thermopile array (3.75° by 3.75° per pixel) which measures most of the interior of the beam dump.

Because of the high and intense levels of backscatter radiation in the 1070 nm regime are so strong, aggressive bandpass filtering is required to enable meaningful stand-off temperature measurements. Filtering is accomplished through the use of beam dump mirror IR sensing array with germanium window 134, as shown in FIGS. 9 and 10. Germanium window 134 is a 10 mm diameter×1.5 mm thick disk with antireflective coating from Edmunds optics (part 62-643). To further enhance signal clarity, the laser is turned off for a brief instant (1 ms) during temperature readings.

Figure 11:
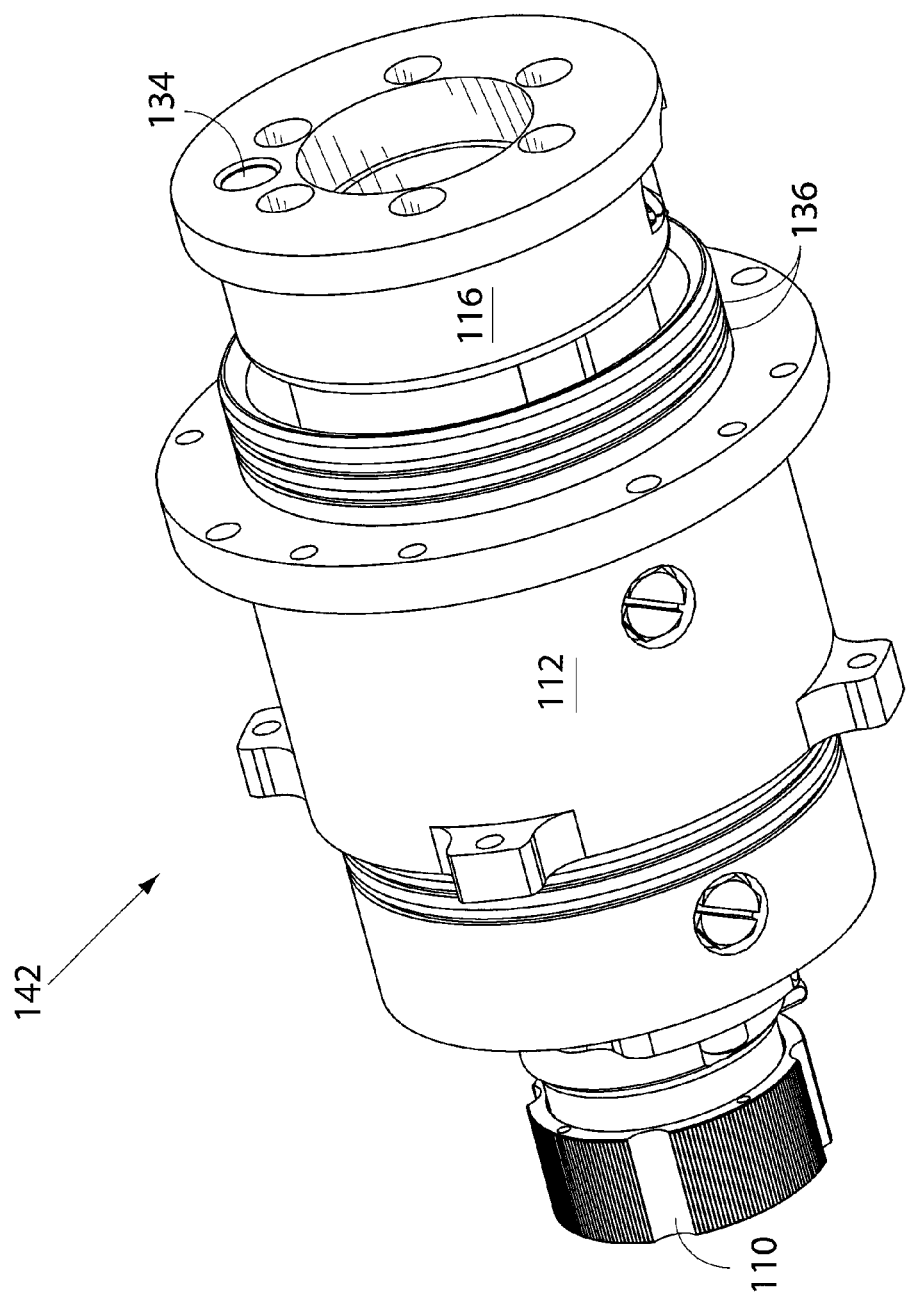
FIG. 11 is a side perspective view of the beam dump optics module of the present invention.

FIG. 11 shows beam dump optics module 142 which includes beam dispersion optics diagnostic module 116 attached to beam dump optics junction block 112. Dual radial O-rings 136 are seated in grooves at the end where beam dump optics junction block 112 connects to beam dispersion optics diagnostic module 116. QBH bulkhead penetrator or connector 110 is connected to beam dump optics junction block 112 at the end opposite the beam dispersion optics diagnostic module 116.

Figure 12:
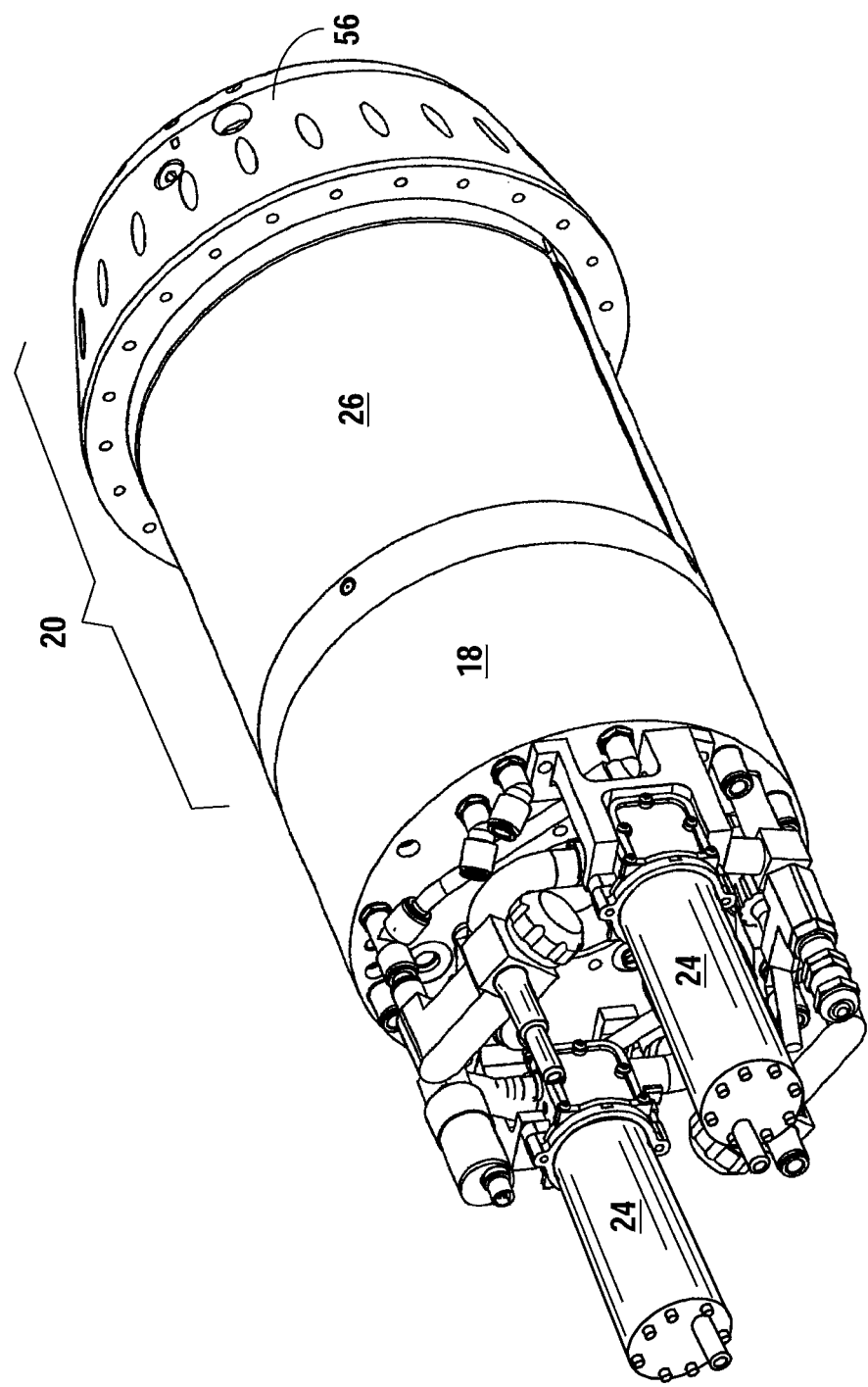
FIG. 12 is a rear perspective view of an embodiment of the present invention.

The rear of the beam dump is populated with a number of fluid control systems, including redundant diaphragm pumps (for driving the hot water jets), pre-pump intake filters and over-pressure regulators. In another embodiment, the present invention may include servo-controlled pump output routing valves to steer flow to lateral cutting jets vice the forward central nozzle (i.e., forward melt jet 94). Referring now to FIG. 12, two onboard hot water jet pumps 24 are driven by electrical power generated by the PV array (not shown). The pumps 24 provide three separate services to the vehicle 10. First, the pumps 24 are the primary driver for the forward (descent) melt jet 94 and lateral (turning) melt jets 78. Second, the pumps 24 send warm water to other parts of the vehicle 10 to prevent refreeze. Third, the pumps 24 draw water from the nose of the vehicle 10 (against fresh ice melt) for the water sampling system. On a nominal Europa analog mission (e.g., a 3,000 meter descend to South Pole Lake), the pumps 24 will need to be reliably functional for periods of up to two months (assuming a 100 m/day descent rate for a vehicle powered with a 20 kW laser, and assuming round trip sample return mission).

Several factors were considered in the pump selection process, including flow rate (~5 L/min), pressure (~103 kPa), ability to pump water (particularly sediment-laden water), overall size of the pump assembly (a small footprint was needed), and pump efficiency. The flow rate and pressures required were available in many pumps, but the majority were of large size, low efficiency or unable to pump water.

The onboard hot water jet pumps 24 used on the vehicle 10 are FloJet LF12 diaphragm style pumps which use 12 or 24 volt DC power and are designed to pump water. A single LF12 does not pump sufficient water to meet the required 5 L/min desired flow rate. Because of the compactness of the LF12 pumps, two onboard hot water jet pumps 24 are used in parallel, as shown in FIG. 12. This also builds some redundancy into the system. If one pump fails, the mission could continue on the remaining pump at a reduced capacity.

Figure 13:
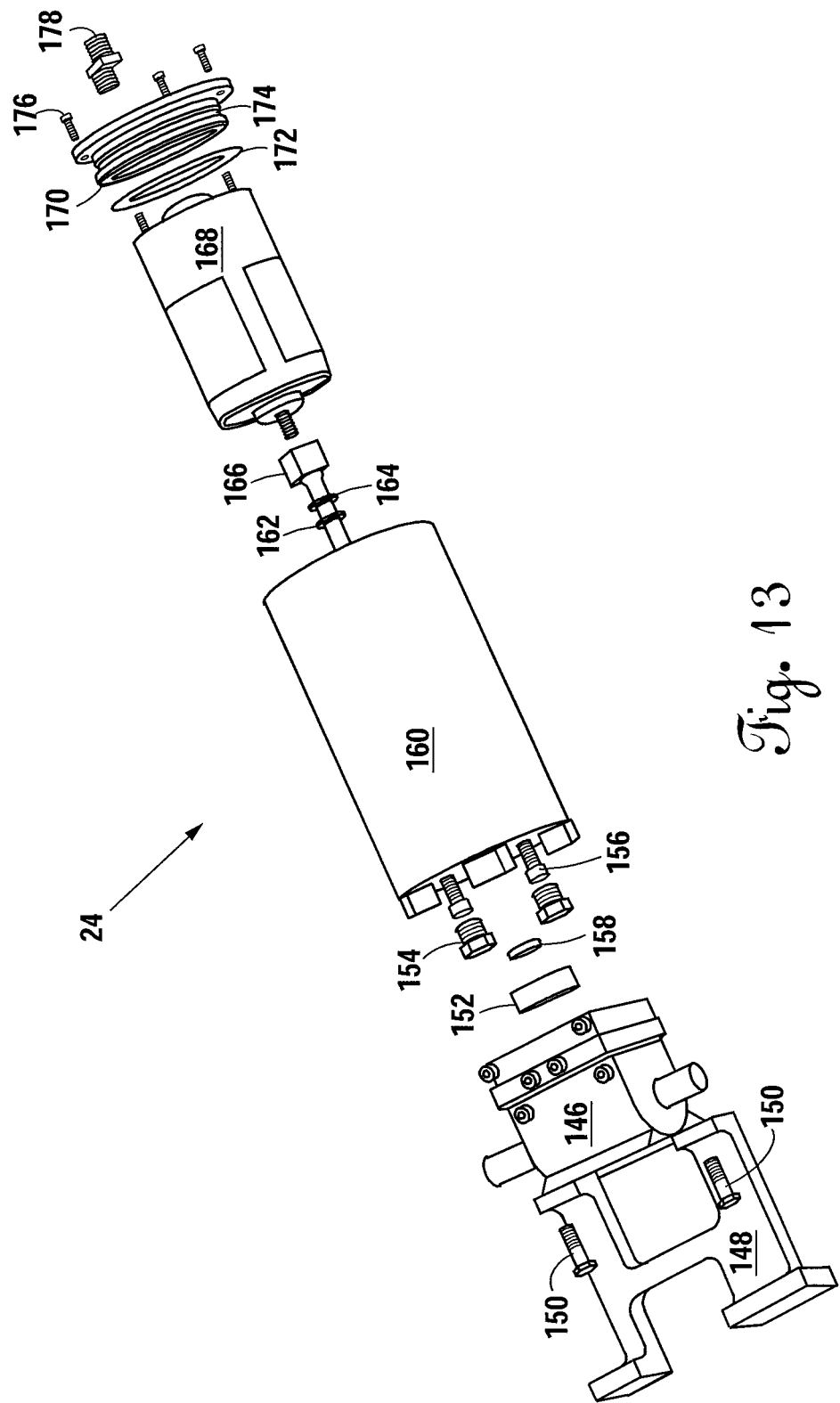
FIG. 13 is an exploded side view of a custom-designed diaphragm pump of the present invention used to drive hot water jets to speed movement through ice.

FIG. 13 shows an exploded view of one of the onboard hot water jet pumps 24. The LF12 pump head 146 is mounted to mount bracket 148 by screws 150. Pump head 146 connects to motor 168 via motor shaft 166. Motor 168 is a brushed DC motor. In an alternative embodiment, a pressure compensated brushless DC motor drive may be used to permit the pump to run at basically unlimited depths. An improvement in power efficiency may also be demonstrated due to the brushless design.

Figure 14:
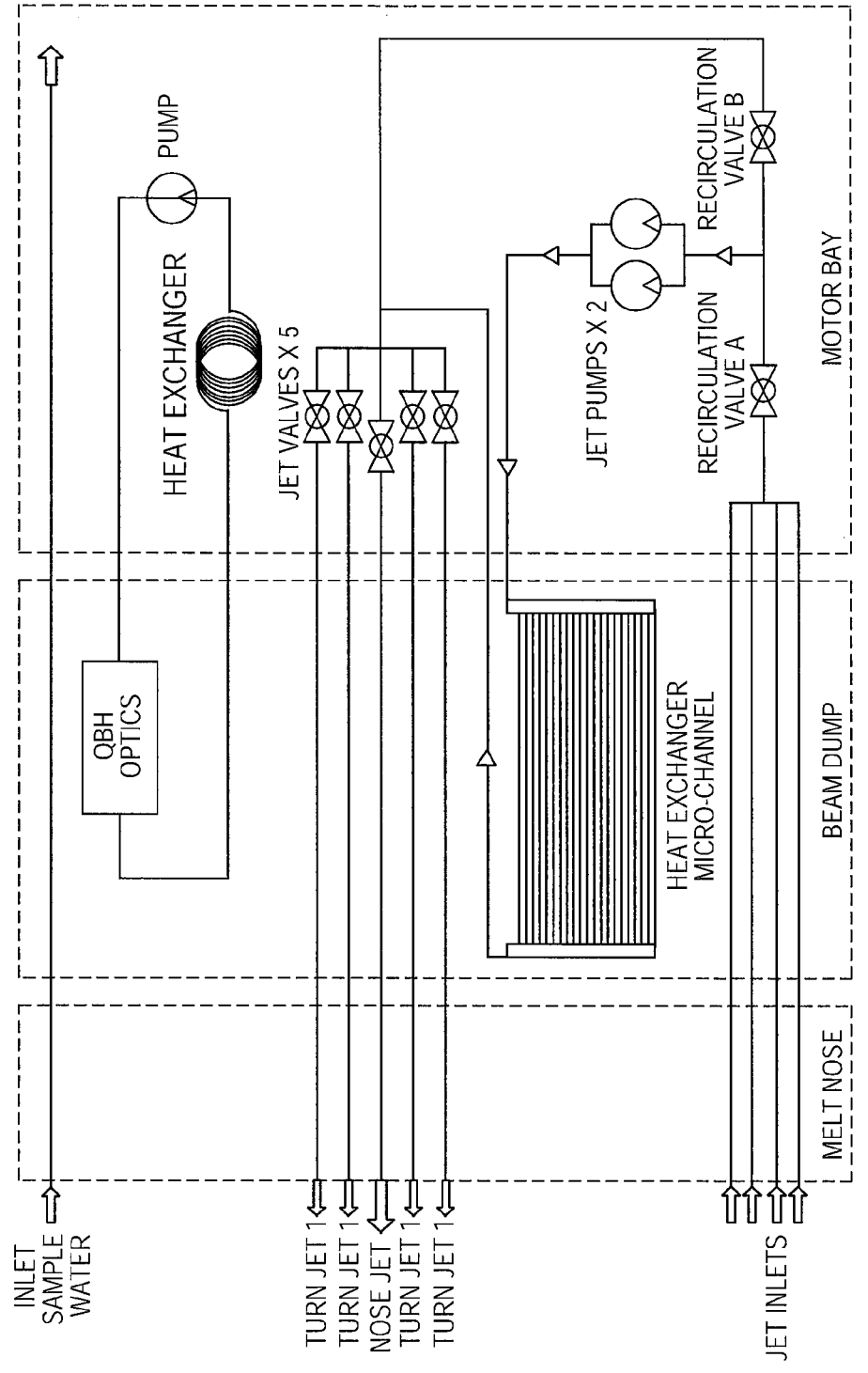
FIG. 14 is the pump flow diagram for the present invention.

Still referring to FIG. 13, ceramic bearing 152 is positioned between pump head 146 and motor shaft 166. Shaft seal retaining clip 164 and shaft seal 162 connect to motor shaft 166. Cap 170 having O-ring 172 within groove 174 is attached to motor 168 via screws 176. A pin connector 178 is attached on cap 170. Pin connector 178 is an IE55 3 Pin Connector. Motor 168 mounts into pump housing 160 via mounting screws 156. Ceramic bearing 158 connects to motor shaft 166. Seal screw 154 seals pump housing 160. Pump housing 160 is an oil-filled housing rated for 300 meters service depth. A pump flow diagram is shown in FIG. 14.

Although a diaphragm type pump is described herein, it is noted that other types of pumps may be used so long as they are able to be accommodated within the tight size constraints of the vehicle and can handle long duration operation and do so reliably in the presence of significant sediment in the intake water.

Regarding the onboard power generation of the present invention, while the majority of the energy conveyed to the vehicle 10 from the process laser 30 will be used in melting ice ahead of vehicle 10, it is necessary to convert a portion of the laser power to electrical power to run vehicle 10. Mission lengths on the order of days to weeks preclude onboard power stored solutions. Laser-derived power will be used to run electronics, sensors, pumps and other actuators onboard the vehicle 10.

The power conversion method uses laser-hard, tuned wavelength photovoltaic (PV) cells that are placed at the far end of the beam dump and circumferentially around the walls of the heat exchanger cavity. The PV cells are experimental prototypes developed by SpectroLab and utilize a metamorphic InGaAs layer on a Ge substrate. They have a very high quantity efficiency for the operating wavelength of the present invention. The power conversion method has been adequately described in prior pending application Ser. Nos. 13/303,449 and 14/292,495, which are incorporated herein by reference.

Figure 15:
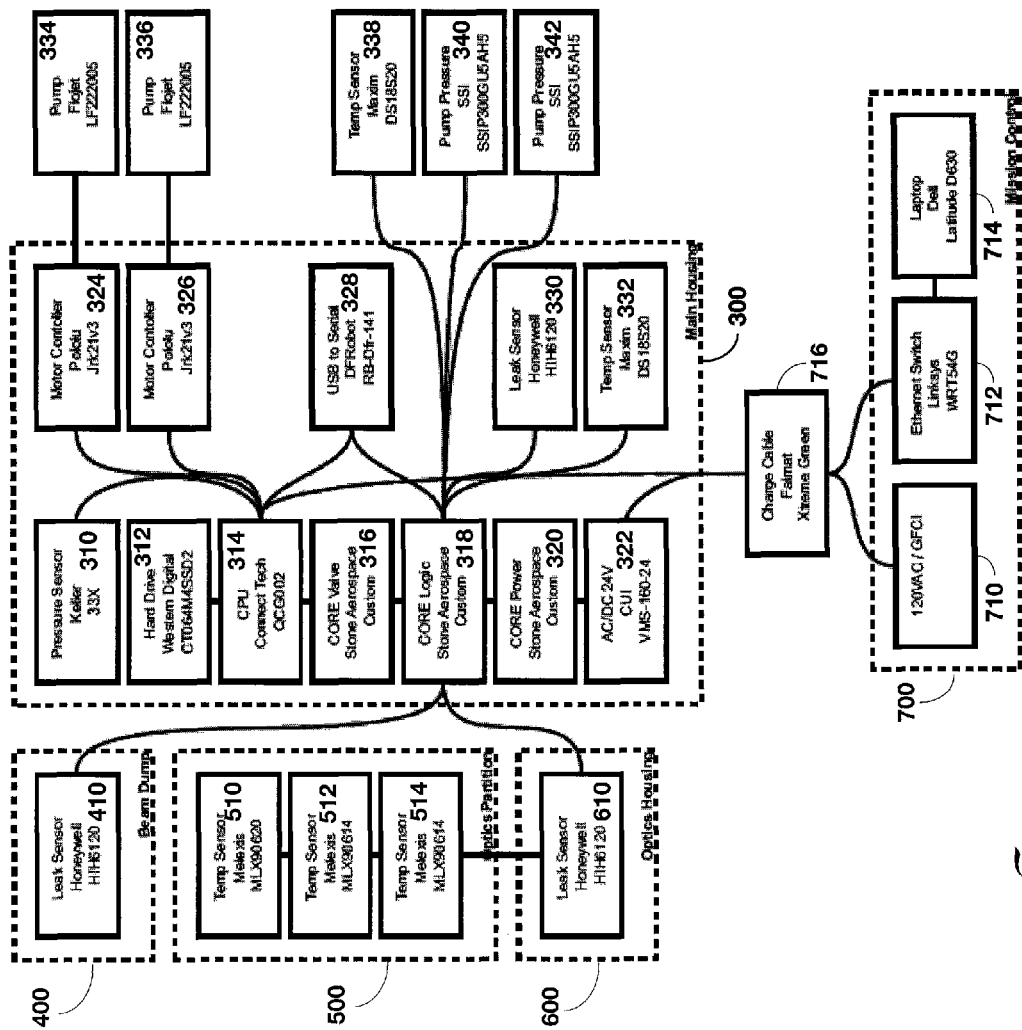
FIG. 15 is an electronics block diagram for the present invention.

The vehicle 10 has an onboard control system or stack 28 (see FIGS. 1, 2) that can fit within the 25 cm diameter of the vehicle 10. The general block architecture of this system is shown in FIG. 15. Main housing 300 contains a PC104 form factor CPU stack and is used to interface with, and provide power to, all other sensors on the vehicle 10. Beam dump 400, optics partition 500, and optics housing 600 are housed within the same container (the beam dump) but packaging effectively made these separate compartments concerning the electronics.

Main housing 300 also contains hard drive 312 and CORE Logic board 318, a custom breakout board microcontroller designed to interface with most of the sensors on the vehicle—including leak sensor 330 and temperature sensor 332, as well as temperature sensor 338, pump pressure 340 and pump pressure 342 (of main housing 300), leak sensor 410 (of beam dump 400) and leak sensor 610 (of optics housing 600)—and quickly respond to critical errors. Leak sensors 410 and 610 are Honeywell HIH6120 sensors which measure relative humidity.

The microcontroller interfaces with external sensors primarily using a 4-port I2C hub in addition to other digital I/O pins. The microcontroller monitors the temperature of the lens, lens holder, and optics block and triggers the laser interlock (i.e., shut down the laser) in the event of an over-temperature fault. The microcontroller also handles external requests to turn on/off the laser interlock. Critical faults requiring a robust and quick response (e.g., lens over-temperature, mount over-temperature) are handled on the microcontroller itself as an added layer of protection in case the CORE Logic driver running on CPU 314 fails for some reason. For the main microcontroller, CORE Logic board 318 uses an Arduino Ethernet, which is commercially available as an off the shelf component.

Still referring to FIG. 15, CPU 314 is used to log mission data, relay data to mission control 700, and interface with a high precision pressure sensor 310 (used to measure water depth), pump control boards 334 and 336, and CORE Logic board 318. CPU 314 further interfaces with motor controllers 324 and 326. Motor controllers 324 and 326 are Pololu Jrk21v3. USB-to-serial adapter 328 connects CPU 314 to CORE Logic board 318 allowing remote re-programming of the microcontroller without opening electronics housing 300. USB-to-serial adapter 328 is a DFRobot RB-Dfr-141. Main housing 300 also contains the AC/DC 24V power supply 322 (CUI model VMS-160-24).

CORE Valve board 316 serves as a DC/DC converter to generate +5, and +/−12V for the entire vehicle 10. In an alternative embodiment, CORE Valve board 316 may also control CORE power 320 to CPU 314 and CORE valves 316.

Hall effect sensors (not shown) are used to measure the operating current for the hot water jet pumps and custom, oil-filled depth-compensated I2C pressure sensors monitor pump output pressures.

Leak sensor 610 prevents condensation and leaks from occurring in optics housing 600, as shown in FIG. 15. Leak sensor 610 has proven robust at detecting even minute leaks in beam dump 400, where condensate on the optics could produce a laser shutdown.

A housing end plate I/O 29 of the onboard CPU/electronics control and sensing stack 28 contains a plurality of ports for a variety of sensors, controls, output pressures for pumps, and an external power and data link I/O, as partially shown in FIG. 2. All ports are bulkhead underwater connectors with 1 km depth rating. However, other depth ratings (e.g., 4 kilometer rating, 11 kilometer rating, etc . . . ) may be utilized and still be within the contemplation of the present invention. The same holds true for all of the components of the vehicle so long as the substituted components provide the same functionality.

A scheduler may be used to sample each sensor at a pre-determined rate. The main loop handles scheduled events and checks to see if the serial port has any new data. If a status request is received, it prints the sensor data and fault status in a human readable format. This information is useful for debugging the system since device operation can be monitored without using an intermediate program.

Vehicle 10 interfaces with and can be remotely controlled from mission control 700 via umbilical charge cable 716 (which contains laser fiber 30, Ethernet data link, and optics mission-start cooling tubes) with a device such as a computer, laptop, tablet or other similar device. A Dell Latitude D630 laptop was used with a Linksys WRT54G Ethernet Switch 712 and 12VAC/GFCI 710. It is noted that the use of any surface umbilicals was utilized for debugging the vehicle. The final vehicle contains no external connections but instead receives its power solely from the laser bare fiber. Communication is accomplished either by duplex modulation of the laser or by trailing a separate bare communications fiber.

The various embodiments described herein may be used singularly or in conjunction with other similar devices. The present disclosure includes preferred or illustrative embodiments in which an autonomous laser-powered vehicle is described. Alternative embodiments of such a vehicle can be used in carrying out the invention as claimed and such alternative embodiments are limited only by the claims themselves. Other aspects and advantages of the present invention may be obtained from a study of this disclosure and the drawings, along with the appended claims.

We claim:

1. An autonomous laser-powered vehicle for penetrating through ice, said vehicle comprising:
    a laser power source;
    a housing;
    a fiber spooler mounted within said housing;
    a fiber for transmitting a laser beam, said fiber having a first end and a second end, said first end of said fiber connected to said laser power source and said second end of said fiber wound about said fiber spooler;
    a fiber connector having a first end and a second end, wherein said fiber is optically connected to said first end of said fiber connector;
    a beam dispersion optics for receiving said laser beam, said beam dispersion optics optically connected to said second end of said fiber connector and wherein at least one beam dispersion lens expands said laser beam into a cone configuration;
    a beam dump heat exchanger having a first end and a second end, said first end of said beam dump heat exchanger optically connected to said beam dispersion optics to receive said expanded laser beam;
    a mirror connected to said second end of said beam dump heat exchanger, said mirror reflecting said expanded laser beam onto a side wall of said beam dump heat exchanger;
    a nose heat exchanger having a first end and a second end, said first end of said nose heat exchanger connected to said mirror and said second end of said nose heat exchanger having a recessed portion containing a plurality of planar heat exchanger channels for cooling the temperature of said mirror;
    an end plate connected to said recessed portion of said nose heat exchanger and having a forward melt jet for melting ice, said end plate having a plurality of melt water return channels drawing water back through said beam dump heat exchanger;
    a synthetic aperture radar (SAR) antenna mounted on said beam dump heat exchanger for avoiding obstacles as said vehicle descends through ice;
    a hot water jet pump assembly for pulling meltwater from said end plate as said vehicle descends through ice; and
    an onboard power generation assembly electrically connected to electronics, sensors, pumps and other actuators onboard said vehicle.

2. The autonomous laser-powered vehicle as recited in claim 1, wherein said hot water jet pump assembly further comprise a plurality of hot water jet pumps in a parallel configuration.

3. The autonomous laser-powered vehicle as recited in claim 1, wherein said beam dump heat exchanger further comprises a plurality of circular beveled grooves within the inner circumference of said beam dump heat exchanger, said plurality of circular beveled grooves absorbing reflected light from said mirror to prevent reflection back towards said beam dispersion optics.

4. A beam dump assembly, said beam dump assembly comprising:
    a laser power source;

a bare laser fiber through which a laser beam generated from said power source is transmitted;

a beam dispersion optics;

a fiber connector having a first and a second end, said first end connected to said bare laser fiber and said second end connected to said beam dispersion optics;

a beam expansion cavity; and a beam dump heat exchanger having a cylindrical pressure vessel wall and a conical portion wherein said beam dump heat exchanger further comprises a plurality of beveled grooves within the circumference of a side wall within said beam dump heat exchanger.

5. The beam dump assembly, as recited in claim 4, wherein said plurality of beveled grooves are aligned to face the same direction as said laser beam entering said beam dump heat exchanger.

6. The beam dump assembly, as recited in claim 5, wherein said beam dump heat exchanger further comprises a dispersion mirror, said dispersion mirror reflecting said laser beam received to said side wall of said beam dump heat exchanger.

7. The beam dump assembly, as recited in claim 6, said beam dump heat exchanger further comprising a plurality of microchannel heat exchanger channels, said plurality of microchannel heat exchanger channels axially traversing said pressure vessel wall.

8. The beam dump assembly, as recited in claim 7, further comprising a radiation shield positioned between said beam dispersion optics and said beam expansion cavity for limiting backscatter radiation from heating said beam dispersion optics.

* * * * *